Figure 1:
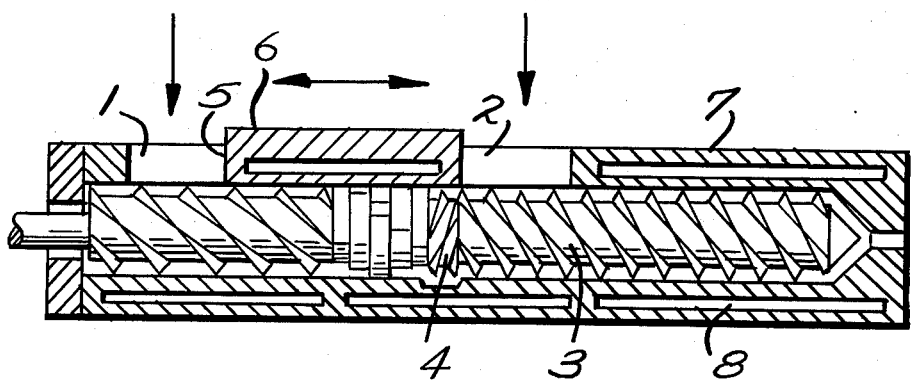

United States Patent [19]
Fritsch

[11] 3,968,955
[45] July 13, 1976

[54] PROCESS AND APPARATUS FOR THE CONTINUOUS PRODUCTION OF VULCANIZABLE MIXTURES

[76] Inventor: Rudolf Paul Fritsch, Goslarer Strasse 58, 7, Stuttgart-Weilimdorf, Germany

[22] Filed: June 20, 1975

[21] Appl. No.: 588,943

Related U.S. Application Data

[60] Division of Ser. No. 429,069, Dec. 28, 1973, Pat. No. 3,904,719, which is a continuation of Ser. No. 850,168, Aug. 14, 1969, abandoned.

[30] Foreign Application Priority Data

Aug. 14, 1968 Germany............................ 1779465

[52] U.S. Cl. ............................................... 259/192
[51] Int. Cl.² ........................................... B29B 1/00
[58] Field of Search................... 259/191, 192, 193; 425/204, 205, 207, 208, 209; 264/176 R

[56] References Cited
UNITED STATES PATENTS

| | | | |
|---|---|---|---|
| 3,008,184 | 11/1961 | Fritsch............................... | 425/204 |
| 3,035,306 | 5/1962 | Rossiter........................... | 425/208 X |
| 3,078,512 | 2/1963 | DeHaven ........................ | 264/176 R |
| 3,121,914 | 2/1964 | Olson et al........................... | 264/349 |

*Primary Examiner*—Richard E. Aegerter
*Assistant Examiner*—Charles E. Phillips
*Attorney, Agent, or Firm*—Cushman, Darby & Cushman

[57] ABSTRACT

A method of and apparatus for continuously and controllably proportioning the components of a vulcanizable mixture in a screw extruding machine having at least one screw shaft and comprising a first inlet and at least one second inlet to the working region of the screw shaft or shafts, the screw shaft or shafts being rotated at constant speed and a back-pressure generating stage being arranged in the said working region, the features of the method being (1) that one component (preferably the main bulk component) of the feed that is to be mixed is introduced into the first inlet in an undosable condition (for instance in the form of plates, slabs or of a non-flowable bulk form) but at a rate controlled by the back pressure produced by the back-pressure generating stage, the latter being located at a given distance away from, and on the down-stream side of, the first inlet as well as upstream in relation to the second or a further inlet, through which an additive material is preferably fed in measured quantity (2) the distance between the edge on the downstream side of the first inlet (the forward edge) and the back-pressure generating stage is so adjusted according to the mixture required that the effect of the generated back pressure extends to the said forward edge of the first inlet and thereby automatically doses the component fed through the first inlet and the throughput of the machine is kept constant.

1 Claim, 2 Drawing Figures

PROCESS AND APPARATUS FOR THE CONTINUOUS PRODUCTION OF VULCANIZABLE MIXTURES

This is a division of application Ser. No. 429,069, filed Dec. 28, 1973, now U.S. Pat. No. 3,904,719, which is a continuation of Ser. No. 850,168 filed Aug. 14, 1969, now abandoned.

The invention relates to a method of and apparatus for continuously producing vulcanizable mixtures of controllable composition and mixture proportions in screw extruders in which the screws rotate at a constant speed.

The method of controlling the rate of introduction of the feed by varying the speed of the screws is well known in the art. However, when machines are used in which the screws revolve at a constant speed, the components of the mixture must always be of a proportionable kind to permit them to be fed into the machine by conventional proportioning feed means.

The provision of equipment which permits the speed of screw shafts in the contemplated method to be continuously varied involves an enormous expenditure in structure means and extremely high cost, quite apart from the difficulty of obtaining such equipment on the market. Moreover, for operational reasons constant screw speeds are very desirable.

When machines having screw shafts rotating at a constant speed are employed, the problem arises of continuously providing proportionable feeds, i.e., principally of pellets or the like for forming the basic mass. This also necessitates the provision of expensive equipment. The pellets must be continuously maintained in a proportionable state, i.e. steps must be taken to prevent them from sticking or caking together. This necessity already requires that complicated equipment is provided in the bunkers, or other storage facilities for keeping the feed in the desired proportionable state. Even if these drawbacks are accepted as unavoidable, difficulties in maintaining the accuracy of conventional proportioning devices still arise, and they make themselves particularly felt in the feeding of the basic material because this naturally constitutes the bulk of the mixture required in larger proportions than the other components.

It is therefore the object of the present invention to overcome the above described troubles. It is desired to provide equipment for continuously producing vulcanizable mixtures of accurately proportioned components in machines wherein — for the above stated reasons — the screw shafts revolve at constant speed. It is also proposed to avoid the special expenditure in means otherwise needed for preparing a proportionable basic mass for forming the mixture.

Substantially the method according to the invention consists in that a component of the feed that is to be mixed (generally the major component) is introduced into the machine in a condition in which it is not proportionable (for instance in the form of slabs (Platten) or of a non-flowable bulk (Haufwerk) feed) and at a rate depending upon the back pressure produced by a back-pressure generating stage located a given distance away from and on the downstream side of the input opening for said component into the machine as well as a given distance away from, and on the upstream side of one (or more) additional input openings, the distance between the edge on the downstream side of the first input opening (forward edge) and the back-pressure-generating stage being so adjusted that the effect of the generated back pressure extends to said forward edge of said opening and thereby automatically controls and keeps constant the rate at which the component of the feed is drawn into this opening.

The invention therefore resides in the use of novel effects obtained by employing principles already known in extruder technology in combination with the introduction into the machine of non-proportionable feeds, particularly of the major mixture component, in a manner rendered possible by the use of said novel effects.

The invention not only provides the expected results but is in fact fundamental to the feasibility of a continuous process of manufacture in this particular field. Although, as has already been mentioned, the use of a proportionable major mixture component in principle and theoretically already permits a continuous process to be performed, this has not in fact been done in previous practice because of the major draw-backs that are involved and not least because of the fact that from a purely procedural point of view, i.e., from the point of view of the quality of the product, it could not be satisfactorily performed, since errors in the accuracy of proportioning the major mixture component were impossible to avoid.

A particularly useful further development of the invention comprises the inclusion of a measuring and controlling process which controls the intended proportions in the mixture of other components which enter the machine through one or more additional openings, and which are capable of being proportioned in any desired quantities, such as a vulcanizing agent, by reference to the rate of introduction of the non-proportionable component through the first mentioned input opening of the machine.

Apparatus for performing the method according to the invention is substantially constructed in the manner of a conventional screw extruder having screw shafts revolving at constant speed and provided with at least two input openings for the components of the feed, the proposed apparatus being characterised by the following features:

The back-pressure-generating stage is a throttling stage of conventional construction having a controllably variable throttling gap. This feature permits the back-pressure-generating stage to be adjusted according to the consistency (viscosity) of the introduced feed.

Means are provided for adjusting the distance between the back-pressure-generating stage and the input opening on its upstream side.

A particularly convenient embodiment of such means of adjusting said distance is a slide forming part of the casing or shell of the machine and adapted to be slidably displaced for varying said distance between the back-pressure-generating stage and the rear edge of the input opening on the upstream side. This slide may be so designed that its adjustment will also adjust an additional input opening on the downstream side of the pressure-generating stage. This latter opening may be used for the introduction of the components that are in a proportionable state, scuh as a vulcanizing agent and the like.

Figure 2:
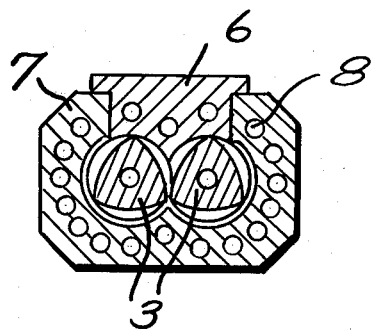

The drawings are a simplified representation of an embodiment of a machine equipped with means according to the invention for performing the proposed method. In the drawings FIG. 1 is an axial section of the machine and
FIG. 2 is a cross section thereof.

The machine is a twin-shaft screw extruder having inter-engaging co-rotating screws. Besides mixing the components the machine also extrudes the mixture.

1 is an input opening for a feed which is to form the basic and principal component, and which is not in a proportionable state. This component is drawn into the machine by the two constant speed screws 3. A back-pressure-generating stage substantially constituted by a throttling section 4 of conventional kind controls the rate at which this component is drawn in through the opening 1, by means of the back pressure which it creates. Provided the effect of the back pressure extends as far back as the forward edge 5 of the input opening 1 the machine will automatically control the rate of admission of the component. The distance between the input opening 1 and the back-pressure-stage is controllable. To this end a slide 6 is provided which forms part of the shell 7 of the machine, and which can be slidably adjusted to vary the distance between the back-pressure stage and the downstream side edge of the input opening 1.

At the same time the slide 6 varies a second input opening on the downstream side of the back-pressure stage, said latter input opening serving for the introduction of other components, such as of a vulcanizing agent, into the machine. Measuring and control means of conventional kind are provided which determined the correct proportion of the components entering through the opening 2 by reference to the rate of admission of the non-proportionable component which is drawn in through the input opening 1 of the machine.

8 are cavities for the circulation therethrough of a heating medium or a coolant.

The construction of the throttling point constituting the back-pressure-generating stage is so chosen that the throttling gap can be varied to make allowance for the particular viscosity of the feed.

The screw extruder for performing the proposed method is incidentally equipped with devices required for conventional processing. It will contain several zones including a zone for drawing in the components, a dispersing as well as an extruding zone comprising suitably designed screw elements. The introduction, discharge and removal of the non-proportionable material introduced through the opening 1 as well as that of the additives introduced through the opening 2 is effected by means that are well known in the art. A large number of diverse possibilities are available. For instance, for introducing a slab or plate shaped feed through the opening 1 an automatic vacuum lift may be provided which delivers the slabs down a chute under the control of a photoelectric detector, via a cutting means, likewise photo-electrically controlled, into the draw-in input opening 1.

The proposed method and the appropriate structural steps may naturally also be applied to a single-shaft screw extruding machine.

What is claimed is:

1. A screw extruding apparatus for continuously and controllably proportioning the components of a vulcanizable mixture, said apparatus having a bore, at least one screw shaft located in said bore, a back-pressure device located in said bore, a first inlet located upstream of said back-pressure device, a second inlet located downstream of the back-pressure device, means for controllably adjusting the distance between said back-pressure device and said first inlet which includes, a slide member slidably mounted for movement on said apparatus, said slide member defining, in part, a back-pressure zone in said bore extending between said downstream edge of said first inlet and said back-pressure device, so that said back-pressure zone will have a length that is variable corresponding to sliding movement of said slide member on said apparatus.

* * * * *